(12) United States Patent
Yamamoto (10) Patent No.: US 10,109,394 B2
(45) Date of Patent: Oct. 23, 2018

(54) CLAMP MARK AND WIRE HARNESS

(71) Applicant: YAZAKI CORPORATION, Tokyo (JP)

(72) Inventor: Masataka Yamamoto, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/694,450

(22) Filed: Sep. 1, 2017

(65) Prior Publication Data

US 2018/0068765 A1 Mar. 8, 2018

(30) Foreign Application Priority Data

Sep. 5, 2016 (JP) .................................. 2016-173163

(51) Int. Cl.
| | |
|---|---|
| *H02G 3/32* | (2006.01) |
| *H01B 7/36* | (2006.01) |
| *H01B 7/00* | (2006.01) |
| *B60R 16/02* | (2006.01) |

(52) U.S. Cl.
CPC ......... *H01B 7/368* (2013.01); *B60R 16/0215* (2013.01); *H01B 7/0045* (2013.01); *H02G 3/32* (2013.01)

(58) Field of Classification Search
CPC .................. H01B 7/368; H01B 7/0045; H01B 13/01281; H02G 3/32; B60R 16/0215
USPC ......................................... 248/74.1, 73, 74.3
See application file for complete search history.

(56) References Cited

U.S. PATENT DOCUMENTS

| | | | | |
|---|---|---|---|---|
| 4,248,459 A | * | 2/1981 | Pate ...................... | F16L 3/1236 |
| | | | | 174/665 |
| 6,398,170 B1 | * | 6/2002 | Wada ..................... | F16L 3/123 |
| | | | | 248/68.1 |
| 2003/0116215 A1 | * | 6/2003 | Miyamoto .......... | B60R 16/0215 |
| | | | | 138/157 |
| 2008/0302435 A1 | * | 12/2008 | Picton ..................... | F16L 3/18 |
| | | | | 138/107 |

(Continued)

FOREIGN PATENT DOCUMENTS

| | | |
|---|---|---|
| JP | 60-123474 U | 8/1985 |
| JP | 2000-197245 A | 7/2000 |

(Continued)

OTHER PUBLICATIONS

Communication issued Aug. 28, 2018, issued by the Japanese Patent Office in counterpart Japanese Patent Application No. 2016-173163.

*Primary Examiner* — Steven T Sawyer
(74) *Attorney, Agent, or Firm* — Sughrue Mion, PLLC (57) ABSTRACT

A clamp mark includes a mark main body, flange parts and a linear rib. The mark main body has a cylindrical shape. The mark main body is made of resin material by molding. The mark main body covers a circumference of an electric wire entirely in a circumference direction of the electric wire at a predetermined position of the electric wire in an axial direction of the electric wire. The flange parts are respectively provided on both ends of the mark main body in an axial direction of the mark main body so as to project outward in a radial direction of the mark main body from an outer peripheral surface of the mark main body. The rib is provided on and projected from the outer peripheral surface of the mark main body.

3 Claims, 9 Drawing Sheets

(56) References Cited

U.S. PATENT DOCUMENTS

2016/0254654 A1* 9/2016 Matsumura ............... F16B 2/08
24/16 R

FOREIGN PATENT DOCUMENTS

| JP | 2010-260297 A | 11/2010 |
|----|---------------|---------|
| JP | 2012-30429 A  | 2/2012  |
| JP | 2013-103492 A | 5/2013  |
| JP | 2016-144279 A | 8/2016  |

* cited by examiner

CLAMP MARK AND WIRE HARNESS

CROSS REFERENCE TO RELATED APPLICATIONS

This application is based on Japanese Patent Application (No. 2016-173163) filed on Sep. 5, 2016, the contents of which are incorporated herein by way of reference.

BACKGROUND

The invention relates to an electric wire integrated clamp mark and a wire harness.

In a wire harness used for an automobile etc., one or multiple electric wires bundled are fixed to a frame of vehicle mounted equipment or a support part of a vehicle body panel or the like using various fixing devices (such as a clip, a locking device, and a protective tube with a locking device).

A wire harness is configured such that multiple electric wires are collected by a vinyl tape or the like and divided into a trunk line or a branch line, and connectors or terminals are attached to the respective ends of the electric wires. Since the wire harness is manufactured in advance with a predetermined length, unless the wire harness is mounted on the predetermined position of the vehicle, there can occur a case in which it cannot be connected to its mating connector or mating terminal part. Thus, in order to facilitate the mounting work of the wire harness on the predetermined position of the vehicle, in some cases, an electric wire integrated clamp mark is attached to the wire harness (see, for example, the patent document 1).

Figure 9A:
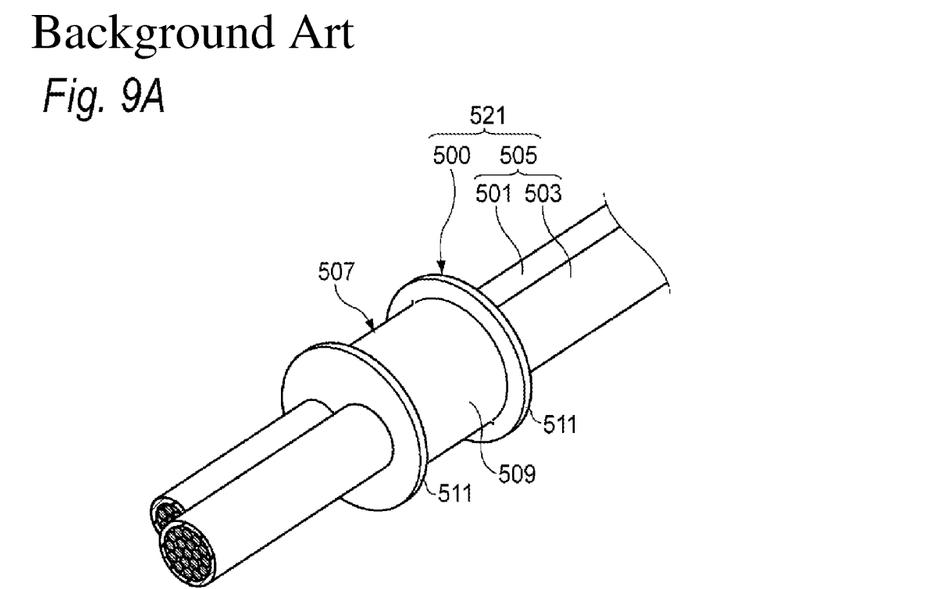
FIG. 9A is a perspective view of a conventional electric wire integrated clamp mark.

As shown in FIG. 9A, in an electric wire integrated clamp mark 500 disclosed in the patent document 1, a mark main body 507 molded out of resin material integrally with two electric wires 505 composed of a small diameter electric wire 501 and a large diameter electric wire 503 so as to surround the entire circumferences of the electric wires 505 includes: a cylindrical part 509 formed in the outer peripheral surface of the mark main body 507; and, flange parts 511 formed on the two end sides of the mark main body 507 in the axial direction of the electric wires 505. After the electric wire integrated clamp mark 500 is fixed to a vehicle body or the like by a P clamp 513 attached to the cylindrical part 509, its movement with respect to the electric wires 505 is regulated.

Figure 9B:
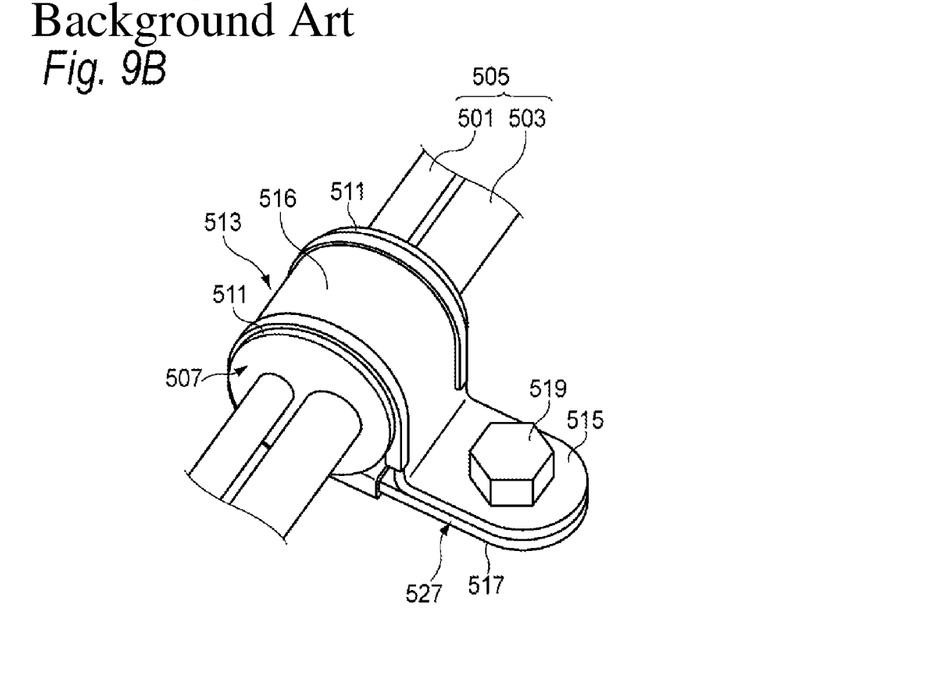
FIG. 9B is a perspective view of a state where the electric wire integrated clamp mark shown in FIG. 9A is fixed by a clamp member.

In the P clamp 513, as shown in FIG. 9B, the tightening piece part 515 and fixing piece part 517 of the clamp main body 527 are tightened by a mounting bolt 519 penetrating through the bolt penetration holes of the two piece parts, whereby the arc-shaped part 516 thereof surrounds and tightens the cylindrical part 509 of the electric wire integrated clamp mark 500. In this case, the mounting bolt 519 is penetrated through a clamp mounting hole formed in a vehicle body panel or a bracket to tighten together the vehicle panel etc. and the P clamp 513. Thus, the wire harness 521 is fixed through the electric wire integrated clamp mark 500 to the predetermined position of the vehicle panel etc. by the P clamp 513.

[Patent Document 1] JP 2016-144279 A

SUMMARY

The invention is made in view of the above circumstances and thus its object is to provide an electric wire integrated clamp mark and a wire harness which, when assembling them to the vehicle, can prevent occurrence of tightening play and, after assembled to the vehicle, can prevent the electric wires from being rotated due to vibrations or the like.

The above object of the invention can be attained by the following configurations.

(i) A clamp mark, including:
a mark main body, having a cylindrical shape, made of resin material by molding, configured to cover a circumference of an electric wire entirely in a circumference direction of the electric wire at a predetermined position of the electric wire in an axial direction of the electric wire;
flange parts respectively provided on both ends of the mark main body in an axial direction of the mark main body so as to project outward in a radial direction of the mark main body from an outer peripheral surface of the mark main body; and
a linear rib provided on and projected from the outer peripheral surface of the mark main body.

(ii) The clamp mark according to the above (ii), wherein the rib extends in a circumferential direction of the mark main body.

(iii) The clamp mark according to the above (iii), wherein the rib extends in the axial direction of the mark main body.

(iv) A wire harness, comprising:
the electric wire; and
the clamp mark according to any one of the above (i) to (iii), which is integrally molded with the electric wire.

DETAILED DESCRIPTION OF EXEMPLIFIED EMBODIMENT

In the electric wire integrated clamp mark 500 shown in FIGS. 9A and 9B, when assembling it to the vehicle, the wire harness 521 arranged on the vehicle is bolt tightened and fixed using the P clamp 513. In this case, since the outer peripheral surface of the mark main body 507 is the cylindrical part 509 and the outer periphery of the cylindrical part 509 is surrounded and tightened by the P clamp 513 in the outer peripheral direction, there is produced a clearance and the like, thereby raising a fear that tightening play can occur. Occurrence of tightening play deteriorates the holding performance. Also, in the electric wire integrated clamp mark 500, since the outer peripheral surface of the mark main body 507 is the cylindrical part 509, when or after the electric wire integrated clamp mark 500 is assembled to the vehicle, the electric wires 505 can be oscillated by a force applied thereto. Occurrence of such oscillations or the like can raise a fear that the electric wire integrated clamp mark 500 can be relatively rotated with respect to the P clamp 513 and thus the electric wires 505 can be twisted. When the electric wires 505 are twisted in this manner, there is a possibility that a load can be applied to the core wires thereof, thereby lowering the electrical conduction performance thereof.

The invention is made in view of the above circumstances and thus one object of the invention is to provide an electric wire integrated clamp mark and a wire harness which, when assembling them to the vehicle, can prevent occurrence of tightening play and, after assembled to the vehicle, can prevent the electric wires from being rotated due to vibrations or the like.

Description is given below of embodiments according to the invention with reference to the drawings.

Figure 1:
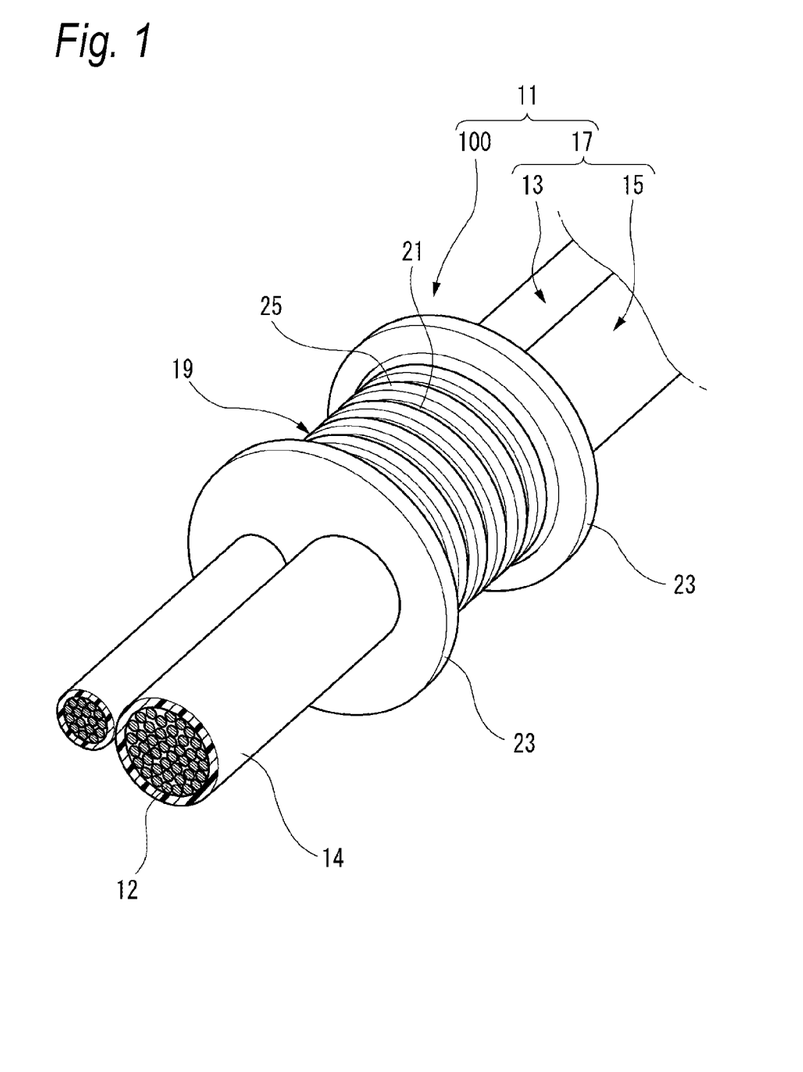
FIG. 1 is a perspective view of an electric wire integrated clamp mark according to a first embodiment of the invention, shown together with an electric wire.

FIG. 1 is a perspective view of an electric wire integrated clamp mark 100 according to a first embodiment of the invention, shown together with an electric wire 17.

The electric wire integrated clamp mark 100 of the first embodiment is applied to various kinds of wire harnesses to be mounted on a vehicle. In the following embodiment, description is given of an example in which the electric wire integrated clamp mark 100 is used in a battery cable 11 serving as a wire harness. The battery cable 11 includes, for example, two electric wires 17 composed of a small diameter electric wire 13 and a large diameter electric wire 15. Each electric wire 17 is a covered wire in which a conductor 12 composed of a stranded wire or a single wire is covered with an insulating sheath 14. To configure the battery cable 11, the electric wire integrated clamp mark 100 may be integrally attached to the predetermined position of the electric wire 17 by molding.

The electric wire integrated clamp mark 100 includes a mark main body 19 surrounding the entire circumference of the electric wire 17, flange parts 23 respectively formed on the two end sides of the mark main body 19 in the axial direction of the electric wire 17, and a linear rib 25 provided on and projected from a cylindrical part 21 which is formed in the outer peripheral surface of the mark main body 19.

The mark main body 19 is integrally molded out of resin material at the predetermined position of the electric wire 17 in the axial direction thereof and surrounds the entire circumference of the electric wire 17. The mark main body 19 is molded into a substantially cylindrical shape.

Figure 6:
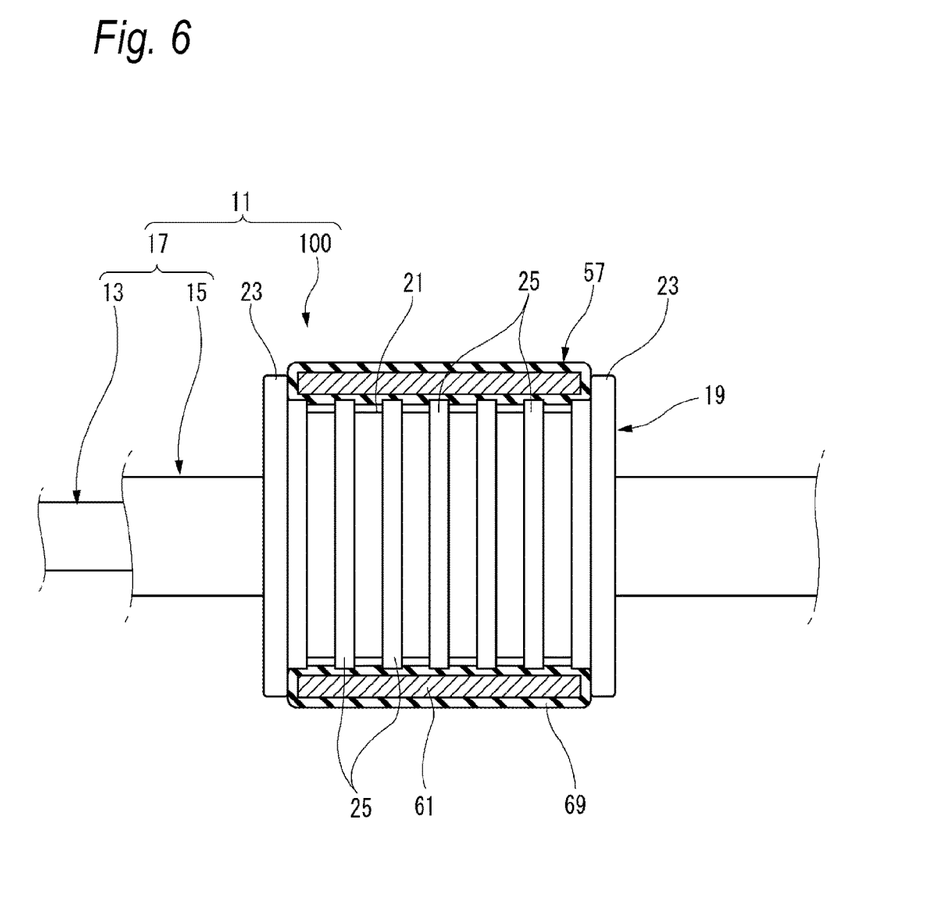
FIG. 6 is a section view of the clamp member shown in FIG. 5, when it is cut along the surface thereof in the axial direction of the electric wire.

The cylindrical part 21 serves as the side surface (the outer peripheral surface in the circumferential direction) of the substantially cylindrical-shaped mark main body 19. On the outer surface of the cylindrical part 21, there is provided the rib 25 projectingly. In the first embodiment, the rib 25 is formed to extend in the circumferential direction of the cylindrical part 21 and provides an annular rib 25. The annular rib 25, preferably, as shown in FIGS. 1 and 6, may preferably be formed in multiple numbers along the axial direction of the cylindrical part 21.

Also, in the first embodiment, the flange part 23 is formed in a collar-like shape having a larger diameter than the cylindrical part 21 so as to project outward in the radial direction beyond the cylindrical part 21; and, flange parts 23 are formed respectively on the two end sides of the mark main body 19 in the axial direction of the electric wire 17. That is, the electric wire integrated clamp mark 100 of the first embodiment is formed in a spool-like shape including a pair of flange parts 23 respectively formed in the two ends of the mark main body 19.

Here, the flange part according to the invention is not limited to the collar-like flange part 23 formed continuously along the outer peripheral surface of the mark main body 19 but can also be constituted of multiple projections intermittently projected along the outer peripheral surface of the mark main body 19.

Figure 2:
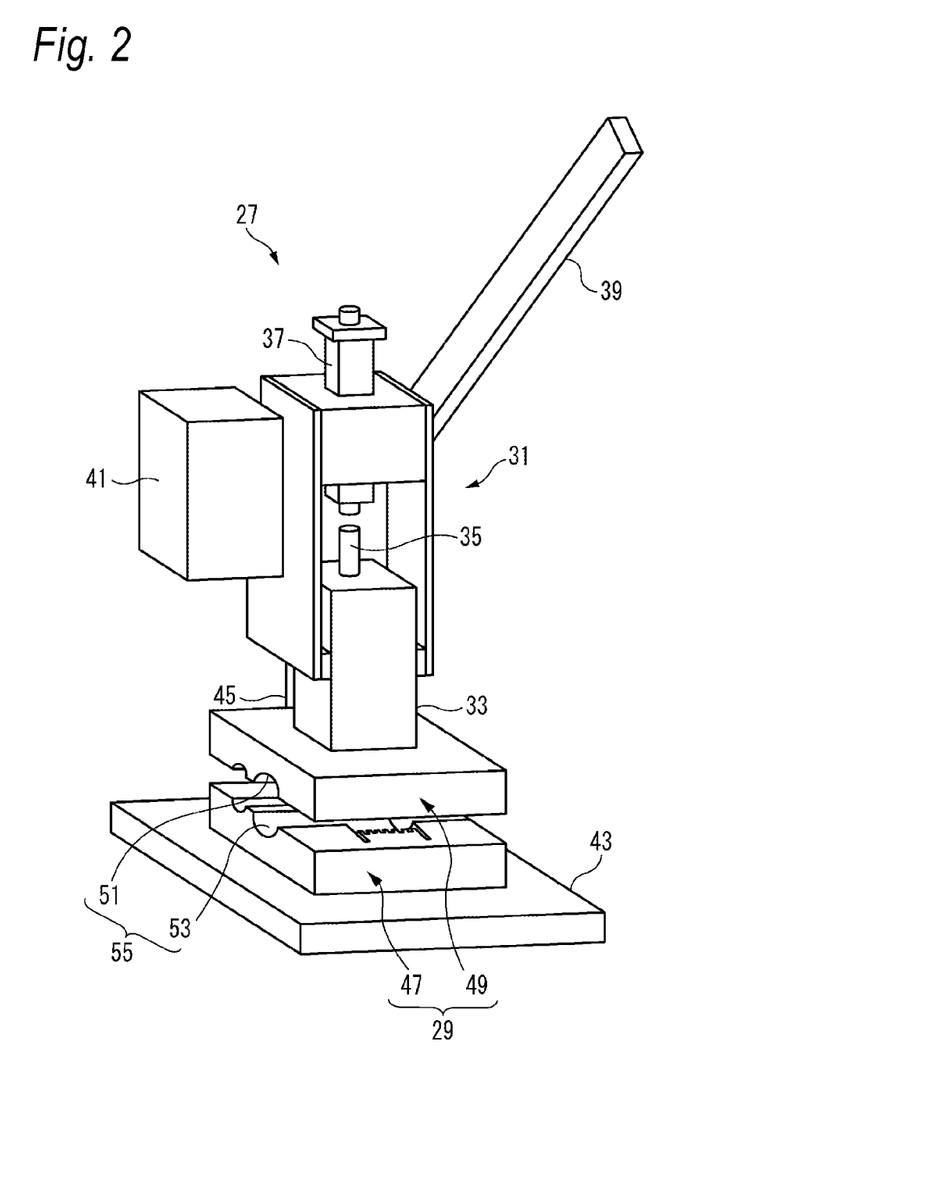
FIG. 2 is a perspective view of the whole of a micro molding machine for micro molding the electric wire integrated clamp mark shown in FIG. 1.

FIG. 2 is a perspective view of the whole of a micro molding machine for molding the electric wire integrated clamp mark 100.

Description is given next of the micro molding machine 27 for molding the electric wire integrated clamp mark 100 in the battery cable 11 integrally therewith.

As shown in FIG. 2, the micro molding machine 27 for molding the electric wire integrated clamp mark 100 integrally with the battery cable 11 can be operated by a single worker without external power such as an electric motor, and includes: a mold 29 made of metal or synthetic resin; a clamping device (not shown); and, a low pressure injection device 31 for injecting molten resin under pressure into the mold 29.

The low pressure injection device 31 includes a heating cylinder 33 equipped with a heater for heating and melting synthetic resin material such as polypropylene, a plunger 35 for injecting molten resin within the heating cylinder from a nozzle (not shown), an injection cylinder 37 for advancing the plunger 35, a handle 39 for driving the injection cylinder 37, and a temperature controller 41 for maintaining the heating temperature of the heating cylinder 33 at a desired temperature, while these composing elements are supported on a device stand 45 erected on a pedestal 43.

Here, the micro molding machine 27 of this embodiment is a machine in which the amount of resin moldable by one injection molding is about 10 g at maximum and also which, when clamping the mold 29, can be manually performed using an air cylinder, a link or the like. Therefore, the low pressure injection device 31 may also be configured such that the injection cylinder 37 is driven by external power such as an electric motor or air. More specifically, as the micro molding machine 27, there can be used a known [injection molding apparatus] which is disclosed in, for example, JPA (Japanese Patent Application) Publications No. 2010-260297, No. 2012-30429 and 2013-103492.

The mold 29 is a horizontal split mold including a lower mold 47 and an upper mold 49, while an upper cavity 51 is formed in the downward facing mold split surface (lower surface) of the upper mold 49. Also, in the upward facing mold split surface (upper surface) of the lower mold 47, there is formed a lower cavity 53 having the same shape as the upper cavity 51. And, when the lower mold 47 and upper mold 49 are clamped and combined together, the lower cavity 53 and upper cavity 51 are united together to thereby define a cavity 55 therein. The mold 29 is clamped in a state where the electric wire 17 is arranged inside the cavity 55.

The upper mold 49 includes a gate (not shown) which allows the cavity 55 and the nozzle of the low pressure injection device 31 to communicate with each other.

In a clamping step, the mold 29 is clamped with the electric wire 17 arranged in the cavity 55, thereby defining a resin material filling space between the cavity 55 and electric wire 17. In the mold 29, the capacity of the filling space when clamped is several cm$^3$. Here, in this embodiment, description has been given of a case in which the mold 29 is a horizontal split mold. However, a vertical split mold may also be used.

In an injection step following the clamping step, molten synthetic resin is injected at low pressure from the gate. The molten resin injected into the cavity 55 is filled into the filling space. In this embodiment, the filling space is formed in a spool-like shape. When the resin material filled in the filling space is solidified, the electric wire integrated clamp mark 100 is molded at the predetermined position of the electric wire 17 integrally therewith.

The electric wire integrated clamp mark 100 molded integrally with the electric wire 17 is mounted with a fixed strength which, in the range of a prescribed electric wire holding strength, prevents it from moving with respect to the electric wire 17. In other words, the electric wire integrated clamp mark 100, by applying a force equal to or greater than the prescribed electric wire holding strength, can be made to move along the electric wire 17. In this case as well, after fixed to a vehicle panel or the like by a P clamp 57 (clamp member) mounted on the cylindrical part 21, the movement of the electric wire integrated clamp mark 100 with respect to the electric wire 17 is regulated.

Figure 3:
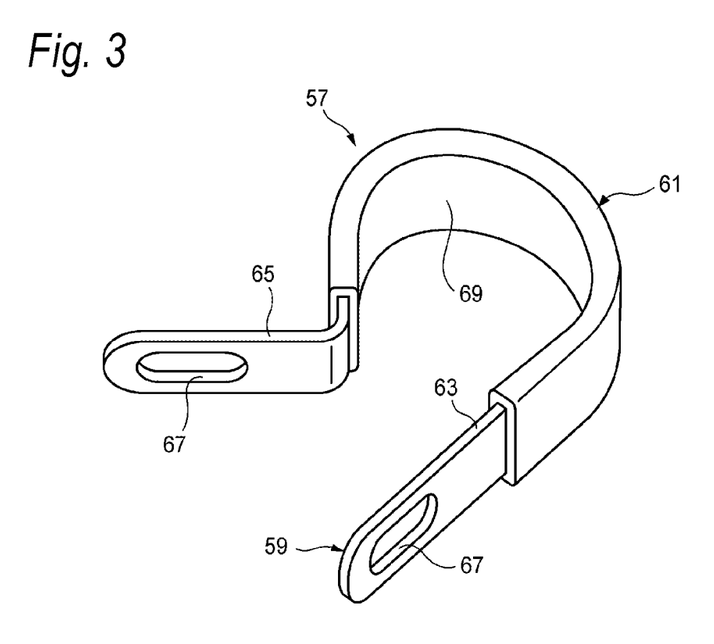
FIG. 3 is a perspective view of a clamp member for use with the electric wire integrated clamp mark shown in FIG. 1.

As the P clamp 57, as shown in FIG. 3, there is used a clamp substantially similar to the conventional P clamp 513 (see FIG. 9B). That is, it is a substantially R-shaped clamp member in which a clamp main body part 59 is made of a belt-shaped metal plate, and a fixing piece part 63 and a tightening piece part 65 each having a strip-like shape are connected to the two ends of an arc shaped part 61. In the tightening piece part 65 and fixing piece part 63 of the P clamp 57, there are drilled bolt penetration holes 67 through which mounting bolts 70 can be inserted.

Also, a rubber-made cushion member 69 is provided in the periphery of the arc shaped part 61 of the P clamp 57. The section of the cushion member 69 in a direction along the axis of the mark main body 19 provides a substantially O-like shape, thereby enabling the cushion member 69 to cover the entire peripheral surface of the arc shaped part 61. Here, the cushion member, similarly to the conventional P clamp 513, may also be configured such that its section in a direction along the axis of the mark main body 19 has a substantially C-like shape, thereby covering the inner peripheral surface of the arc shaped part 61.

The electric wire integrated clamp mark 100 of this embodiment is molded out of resin material (such as polypropylene) harder than the rubber of the cushion member 69. Thus, in the P clamp 57, when it is tightened to the cylindrical part 21 of the mark main body 19, the cushion member 69 is elastically deformed, and multiple ribs 25 provided on and projected annularly from the outer peripheral surface of the cylindrical part 21 bite into the cushion member 69.

Figure 5:
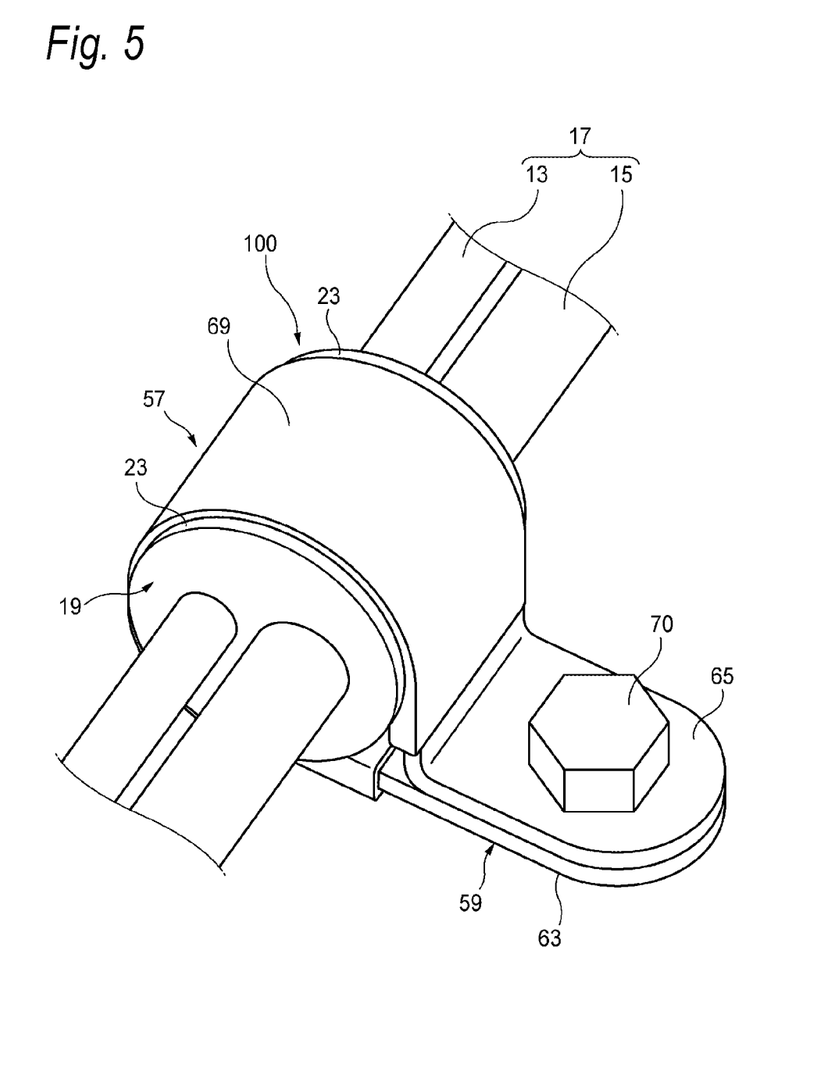
FIG. 5 is a perspective view in which the clamp member is fixed to the electric wire integrated clamp mark shown in FIG. 1.

As shown in FIG. 5, when the tightening piece part 65 and fixing piece part 63 are tightened by mounting bolts (fastening tool) 70 penetrating through the bolt penetration holes 67 of these two piece parts, the P clamp 57 surrounds and tightens the cylindrical part 21 of the electric wire integrated clamp mark 100. In this case, the mounting bolts 70 are penetrated through clamp mounting holes drilled in a vehicle body panel or a bracket to tighten together the vehicle panel or the like and the P clamp 57, whereby the battery cable 11 is fixed through the electric wire integrated clamp mark 100 to the predetermined position of the vehicle panel or the like by the P clamp 57.

Figure 4:
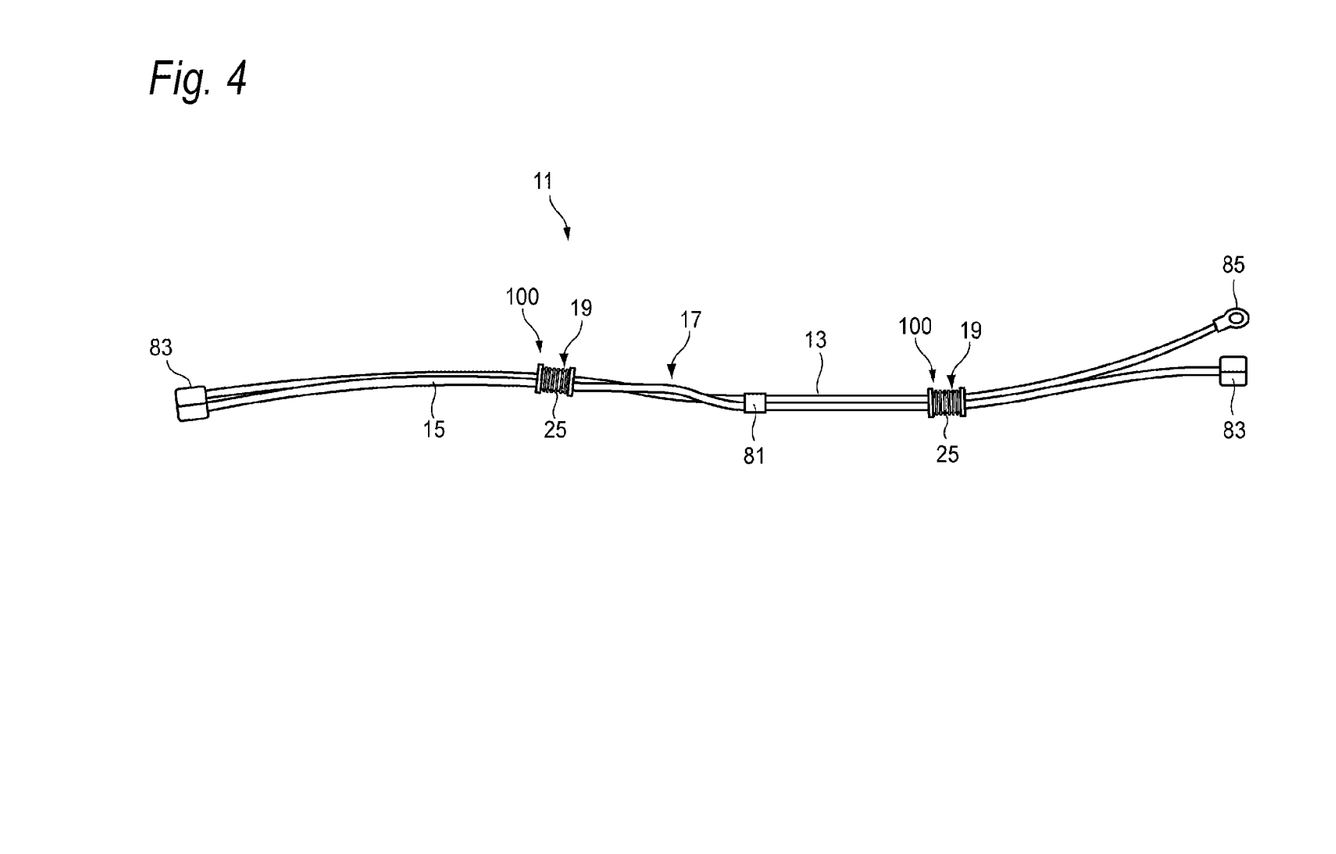
FIG. 4 is a plan view of a wire harness equipped with the electric wire integrated clamp mark shown in FIG. 1.

FIG. 4 is a plan view of the wire harness 11 including the electric wire integrated clamp mark 100 shown in FIG. 1.

In the battery cable 11, multiple (in the illustrated example, two) electric wires 17 are collected by vinyl tape 81 and divided into main lines and branch lines, and connectors 83 and terminals 85 are attached to the ends of the electric wires 17. The battery cable 11 is manufactured in advance with a predetermined length. At the predetermined positions of the battery cable 11 in the axial direction of the electric wire 17, there is molded the electric wire integrated clamp marks 100 while it is oriented in a predetermined rotation direction. Molding of the electric wire integrated clamp mark 100 at the predetermined position enables the battery cable 11 to enhance its mounting position accuracy with respect to the vehicle.

Next, description is given of the operation of the above configuration according to the first embodiment.

In the electric wire integrated clamp marks 100 of the first embodiment, at the predetermined positions of the electric wire 17 in the axial direction, the mark main bodies 19 surrounding the entire circumference of the electric wire 17 are molded out of resin material integrally with the electric wire 17. This enables the electric wire integrated clamp marks 100 to be mounted in the axial direction of the electric wire 17 with high position accuracy, while preventing it against position deviation. Also, linear ribs 25 are provided on and projected from the cylindrical part 21 of the mark main body 19 serving as a tightened surface to be surrounded and tightened by the arc-shaped part 61 of the P clamp 57. The P clamp 57 includes a cushion member 69 on the entire circumference of the arc-shaped part 61. Therefore, as shown in FIG. 6, in the electric wire integrated clamp marks 100 configured such that the cylindrical part 21 of the mark main body 19 is tightened and fixed to the arc-shaped part 61 of the P clamp 57, when assembled to the vehicle, the annularly shaped linear ribs 25 bite into the cushion member 69 of the P clamp 57 to increase its sliding friction with the cushion member 69, thereby suppressing the orientation of the rotation direction of the mark main body 19. This eliminates a possibility that the electric wire integrated clamp marks 100 to be tightened and fixed using the P clamp 57 can be mounted in a state where the electric wire 17 is twisted.

And, such biting of the ribs 25 into the cushion member 69 can suppress occurrence of tightening play between the cylindrical part 21 and P clamp 67 and also can reduce variations in the holding force of the P clamp 57. Also, in the electric wire integrated clamp marks 100, due to such biting of the ribs 25 into the cushion member 69, after assembled to the vehicle, the mark main body 19 is prevented from being rotated with respect to the clamp member even by the twisting or the like of the electric wires 17 caused by a force applied thereto, thereby enabling prevention of occurrence of twisting of the electric wire 17 after assembled to the vehicle.

Further, the electric wire integrated clamp marks 100, when the ribs 25 of the cylindrical part 21 bite into the cushion member 69 of the P clamp 57, receives a reaction force from the P clamp 57. This reaction force acts in a direction to reduce the diameter of the cylindrical part 21. Thus, after assembled to the vehicle, the electric wire 17 is fixed to the mark main body 19 of the electric wire integrated clamp marks 100 by higher holding strength. That is, the electric wire holding strength after assembled to the vehicle can be further enhanced.

In the first embodiment, each rib 25 is formed to extend in the circumferential direction of the cylinder part 21 into an annular shape. The ribs 25 biting into the cushion member 69 of the P clamp 57 increase their sliding friction with the cushion member 69, thereby suppressing the rotation of the cylindrical part 21 with respect to the cushion member 69. Also, the ribs 25 formed annularly in the circumferential direction restrict the movement of the cylindrical part 21 with respect to the P clamp 57 in a direction along the axis of the cylindrical part 21. Thus, even when there is a clearance between the arc-shaped part 61 of the P clamp 57 and flange part 23, the electric wire integrated clamp marks 100 can enhance the position accuracy of the electric wire 17 in the axial direction.

The section shape of the cylindrical part 21 is circular. In the electric wire integrated clamp marks 100, since the mark main body 19 is molded out of resin material by the mold 29 in such a manner that the resin material surrounds the two electric wires 17, it is possible to provide the cylindrical part 21 that necessarily has a circular outer shape.

As a result, in the electric wire integrated clamp marks 100, since the cylindrical part 21 will not have an elliptical cross section, no variation is caused in the holding force of the P clamp 57 when fixing the electric wires 17 to the vehicle body panel. Therefore, the same holding force is secured regardless of the mounting direction of the P clamp 57 with respect to the cylindrical part 21.

Also, since the mark main body 19 is molded integrally over the entire circumference of the electric wires 17, sand or the like is prevented from entering between the electric wires 17 and mark main body 19 while the vehicle is running. This eliminates a fear that, while driving the vehicle, the sheath 14 of the electric wire 17 can be worn by sand or the like entering between the electric wire 17 and mark main body 19.

Next, description is given of a second embodiment of the invention.

Figure 7:
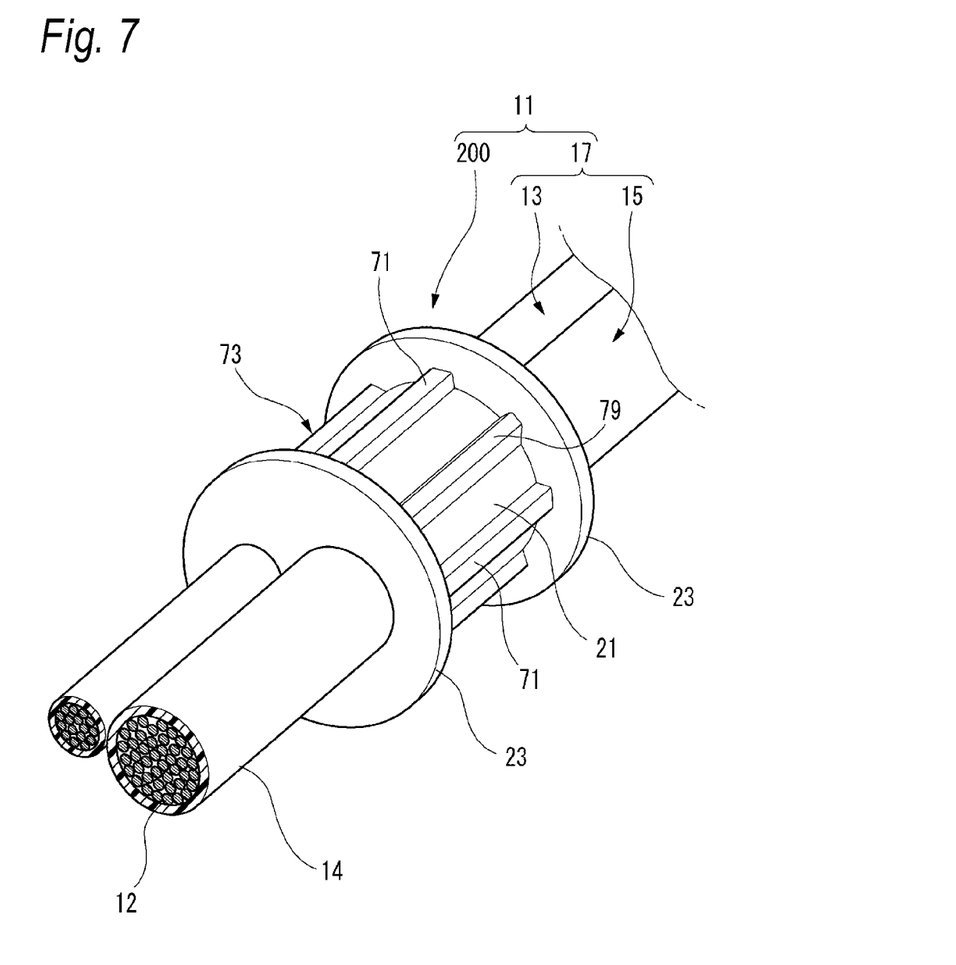
FIG. 7 is a perspective view of an electric wire integrated clamp mark according to a second embodiment of the invention, shown together with an electric wire.

FIG. 7 is a perspective view of an electric wire integrated clamp mark 200 according to a second embodiment of the invention, shown together with an electric wire 17.

In the electric wire integrated clamp mark 200 of the second embodiment, linear ribs 71, 79 are formed to extend in a direction along the axis of a cylindrical part 21 of a mark main body 73. Supposing the annular ribs 25 in the electric wire integrated clamp mark 100 of the first embodiment are called transverse ribs, the axial-direction ribs 71, 79 can be called vertical ribs. In the second embodiment, the ribs 71, 79 are arranged in multiple numbers while they are parallel to each other in the circumferential direction of the cylindrical part 21. The remaining configurations are the same as the electric wire integrated clamp mark 100 of the first embodiment.

Figure 8A:
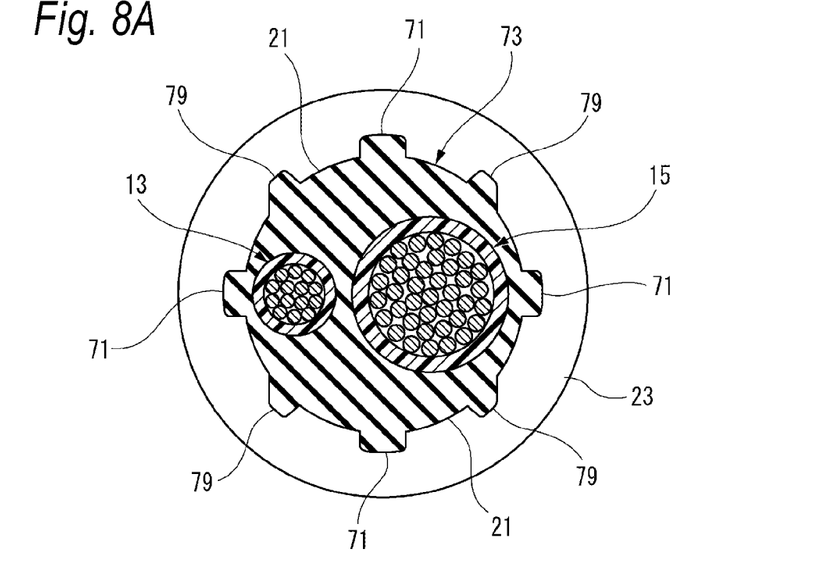
FIG. 8A is a section view of the clamp member shown in FIG. 7, when it is cut along its surface perpendicular to the electric wire.
Figure 8B:
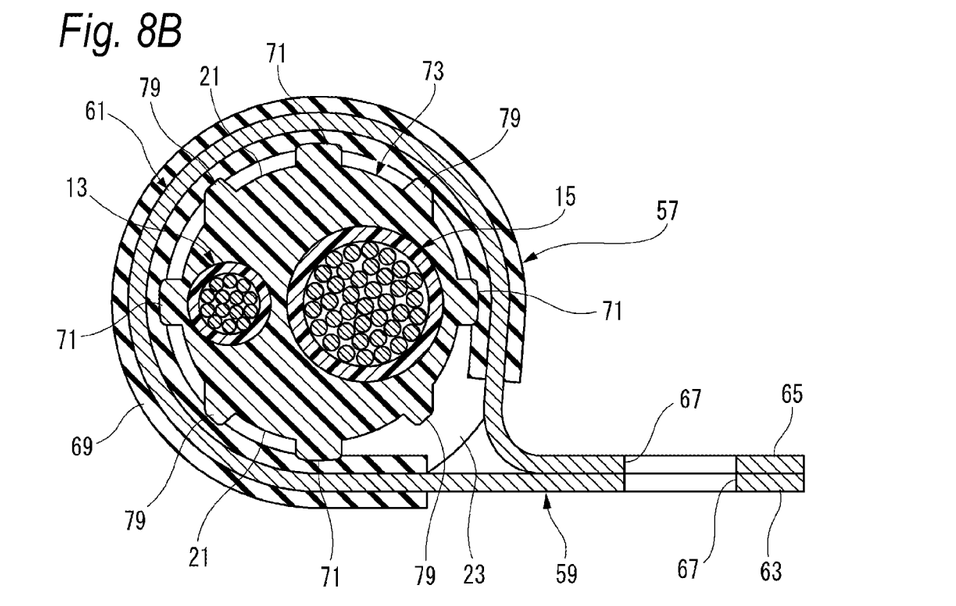
FIG. 8B is a section view of the clamp member shown in FIG. 8A, when it is fixed to the electric wire integrated clamp mark in FIG. 8A.

FIG. 8A is a section view of the electric wire integrated clamp mark 200 shown in FIG. 7, taken along its surface perpendicular to the electric wire 17, and FIG. 8B is a section view in a state where a P clamp 57 is fixed to the electric wire integrated clamp mark 200 shown in FIG. 8A.

The rib 71 is formed such that its section perpendicular to its axial direction has a rectangular shape. Also, the rib 79 is formed such that its section perpendicular to its axial direction has a trapezoidal shape. Here, a rib having a semi-circular shaped section or a triangular shaped section may also be used. The rib 79, when the protruding tip end of its section shape is sharpened, is easy to bite into the cushion member 69. In the electric wire integrated clamp mark 200 of the second embodiment, the ribs 71, 79 having different section shapes are provided mixedly. However, the invention is not limited to this.

Here, the variation of these section shapes can also be applied similarly to the ribs 25 used in the above-mentioned electric wire integrated clamp mark 100.

Particularly, when the axial ribs 71, 79 are provided in multiple numbers in the circumferential direction, as shown in FIGS. 8A and 8B, they may preferably be provided along and adjacent to the small diameter electric wire 13 and large diameter electric wire 15 respectively. The ribs 71, 79 rise in a direction away from the electric wire 17. The ribs 71, 79 can form a flow path space for molten resin in the molding time. That is, between the electric wire 17 and the molding surface of a mold, there is arranged a rib molding groove. Thus, the molten resin is easy to flow toward the opposite side of the gate of the electric wire 17 through the rib molding groove. As a result, the moldability of the cylindrical part 21 and ribs 71, 79 can be improved.

Next, description is given of the operation of the configuration of the second embodiment.

In the electric wire integrated clamp mark 200 of the second embodiment, the ribs 71, 79 of the mark main body 73 are formed to extend in a direction along the axis of the cylindrical part 21. Thus, the ribs 71, 79 biting into the cushion member 69 of the P clamp 67 increase their resistance with the cushion member 69 in the rotation direction, thereby suppressing the rotation of the cylindrical part 21 with respect to the cushion member 69. This rotation-direction resistance is caused by shape engagement. That is, the ribs 71, 79 biting into the cushion member 69 provide a barrier in the rotation direction. Thus, the resistance in the rotation direction becomes much larger than sliding resistance caused by friction. That is, the ribs 71, 79 in the axial direction are enabled to obtain a larger rotation restriction strength than the annular rib 25.

Also, according to the battery cable 11 of the above respective embodiments, when assembling it to the vehicle, the ribs 25, 71, 79 of the cylindrical part 21 bite into the cushion member 69 of the P clamp 57, thereby enabling restriction of tightening play with the P clamp 57. Thus, the battery cable 11, when fixing it to the vehicle using the P clamp 57, can be mounted in the axial direction of the electric wire 17 and in the rotation direction with high position accuracy. As a result, when assembling the battery cable to the vehicle, twisting of the electric wire 17 can be prevented. This can facilitate the connection of the battery cable 11 to its mating connector and mating terminal part, thereby enabling enhanced workability when assembling it to the vehicle. Also, in the battery cable 11, after assembled to the vehicle, the position deviation of the electric wire 17 in the axial direction and rotation direction can be prevented. Thus, the twisting of the electric wire 17 due to vibrations or the like can also be prevented.

Therefore, according to the electric wire integrated clamp mark 100, electric wire integrated clamp mark 200 and battery cable 11 of the respective embodiments, when assembling them to the vehicle, occurrence of tightening play can be prevented and, after assembled, the rotation of the electric wire 17 due to vibrations or the like can be prevented.

Here, in the above respective embodiments, description has been given of the cases where the linear rib is the annular rib 25 and where the linear rib is the axial ribs 71, 78. However, the linear rib may also be formed as a lattice-shaped rib.

Here, the characteristics of the above embodiments of the electric wire integrated clamp mark and wire harness according to the invention are briefly summarized and listed below.

(i) A clamp mark (100), including:
a mark main body (19), having a cylindrical shape, made of resin material by molding, configured to cover a circumference of an electric wire (17) entirely in a circumference direction of the electric wire (17) at a predetermined position of the electric wire (17) in an axial direction of the electric wire (17);
flange parts (23) respectively provided on both ends of the mark main body (19) in an axial direction of the mark main body (19) so as to project outward in a radial direction of the mark main body (19) from an outer peripheral surface of the mark main body (19); and
a linear rib (25) provided on and projected from the outer peripheral surface of the mark main body (19).
(ii) The clamp mark (100) according to the above (i), wherein
the rib (25) extends in a circumferential direction of the mark main body (19).
(iii) The clamp mark (100) according to the above (i), wherein
the rib (25) extends in the axial direction of the mark main body (19).
(iv) A wire harness (11), comprising:
the electric wire (17); and
the clamp mark (100) according to any one of the above (i) to (iii), which is integrally molded with the electric wire (17).

According to the electric wire integrated clamp mark having the above (i), the mark main body surrounding the entire circumference of the electric wire is molded out of resin material integrally with the electric wire at the predetermined position thereof in the axial direction thereof. Thus, the electric wire integrated clamp mark can be mounted in the axial direction of the electric wire with high position accuracy and can be prevented against position deviation. Also, on the cylindrical part of the mark main body serving as a tightened surface which is surrounded and tightened by the arc shaped part of the clamp member, there are projectingly provided the linear ribs. The clamp member includes a cushion member at least in the inner periphery of the arc shaped part. Thus, in the electric wire integrated clamp mark in which the cylindrical part of the mark main body tightened and fixed to the arc shaped part of the clamp member, the linear rib is allowed to bite into the cushion member of the clamp member, thereby increasing its sliding friction with the cushion member to suppress the orientation of the rotation direction of the mark main body. Accordingly, the electric wire integrated clamp mark, which is tightened and fixed using the clamp member, will not be mounted in a state where the electric wire is twisted. Also, the biting of the rib into the cushion member can suppress occurrence of tightening play between the cylindrical part and clamp member. Such rib biting can also reduce variations in the holding force of the clamp member. Also, in the electric wire integrated clamp mark, since the rib bites into the cushion member, after assembled to the vehicle, the mark main body is prevented from rotating with respect to the clamp member even by vibrations or the like caused by a force applied to the electric wire. This makes it possible to prevent the electric wire from being twisted after assembled to the vehicle.

In addition, in the electric wire integrated clamp mark, when the rib of the cylindrical part bites into the cushion member of the clamp member, the rib receives a reaction force from the clamp member. This reaction force acts in a direction to reduce the diameter of the cylindrical part. Thus, after assembled to the vehicle, the electric wire is fixed to the mark main body of the electric wire integrated clamp mark with enhanced holding strength. That is, the electric wire holding strength after assembled to the vehicle can be enhanced.

According to the electric wire integrated clamp mark having the above (ii), the rib extends in the circumferential direction of the cylindrical part and has an annular shape. The annular rib may be continuous or intermittent. Also, the annular rib may preferably be arranged in multiple numbers in a direction along the axis of the cylindrical part. Thus, the ribs biting into the cushion member of the clamp member increase their sliding friction with the cushion member, thereby suppressing the rotation of the cylindrical part with respect to the cushion member. The ribs formed annularly in the circumferential direction restrict the movement of the cylindrical part in the axial direction thereof with respect to the clamp member. Thus, even when there exists a clearance between the arc shaped part and flange part of the clamp member, the electric wire integrated clamp mark can enhance the position accuracy in the axial direction of the electric wire.

According to the electric wire integrated clamp mark having the above (iii), the rib is formed to extend in a direction along the axis of the cylindrical part. The axial-direction rib may be continuous or intermittent. Also, the axial-direction rib may preferably be formed in multiple numbers in the circumferential direction of the cylindrical part. Thus, the ribs biting into the cushion member of the clamp member increase their rotation-direction resistance with the cushion member, thereby suppressing the rotation of the cylindrical part with respect to the cushion member. This rotation-direction resistance is caused by shape engagement. That is, the ribs biting into the cushion member provide a barrier in the rotation direction. Therefore, resistance in the rotation direction becomes much larger than sliding resistance caused by friction. That is, the axial-direction rib can obtain a larger rotation restriction strength than the annular rib.

According to the wire harness having the above (iv), when assembled to the vehicle, the rib of the cylindrical part bites into the cushion member of the clamp member, thereby being able to restrict its tightening play with the clamp member. Thus, the wire harness, when fixing it to the vehicle using the clamp member, can be mounted in the axial direction and rotation direction of the electric wire with high position accuracy. As a result, when assembling the wire harness to the vehicle, the electric wire can be prevented against twisting. This makes it easy for the wire harness to be connected to its mating connector and mating terminal part, thereby enabling enhanced workability when assembling it to the vehicle. Also, in the wire harness, after assembled to the vehicle, the electric wire can be prevented against position deviation in the axial direction and rotation direction thereof. This also can prevent the electric wire from being twisted due to vibrations or the like.

According to the electric wire integrated clamp mark and wire harness of the invention, when assembling them to the vehicle, occurrence of tightening play can be prevented and, after assembled to the vehicle, the electric wires can be prevented from being rotated due to vibrations or the like.

Here, the invention is not limited to the above embodiments but can be properly changed or improved. Also, the materials, shapes, dimensions, numbers, arrangement positions and the like of the respective composing elements of the above embodiments are arbitrary and are not (imitative as long as they can attain the invention.

What is claimed is:

1. A clamp mark, comprising:
   a mark main body, having a cylindrical shape, made of resin material by molding, configured to cover a circumference of an electric wire entirely in a circumference direction of the electric wire at a predetermined position of the electric wire in an axial direction of the electric wire;
   flange parts respectively provided on both ends of the mark main body in an axial direction of the mark main body so as to project outward in a radial direction of the mark main body from an outer peripheral surface of the mark main body; and
   a linear rib provided on and projected from the outer peripheral surface of the mark main body, wherein
   the flange parts project outward from the mark main body at a distance that is greater than a distance in which the linear rib projects outward from the mark main body,
   the linear rib extends in the axial direction of the mark main body,
   the linear rib is a first linear rib,
   the clamp mark further comprises a second linear rib that is provided on and projected from the outer peripheral surface of the mark main body, the second linear rib extending the axial direction of the mark main body, and
   the first linear rib having a different shape than the second linear rib.

2. A wire harness, comprising:
   the electric wire; and
   the clamp mark according to claim 1, which is integrally molded with the electric wire.

3. The clamp mark according to claim 1, wherein
   the linear rib extends to the flange parts respectively provided on both ends of the mark main body.

* * * * *